US010013869B2

(12) United States Patent
Priev et al.

(10) Patent No.: US 10,013,869 B2
(45) Date of Patent: Jul. 3, 2018

(54) EFFECTIVE HANDLING OF DISTRESS SIGNALS IN AN INTERNET OF THINGS ENVIRONMENT

(71) Applicant: Intel Corporation, Santa Clara, CA (US)

(72) Inventors: Avi Priev, Jerusalem (IL); Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 15/060,298

(22) Filed: Mar. 3, 2016

(65) Prior Publication Data

US 2017/0256156 A1 Sep. 7, 2017

(51) Int. Cl.
*G08B 1/00* (2006.01)
*G08B 25/01* (2006.01)

(52) U.S. Cl.
CPC .................. *G08B 25/016* (2013.01)

(58) Field of Classification Search
None
See application file for complete search history.

(56) References Cited

U.S. PATENT DOCUMENTS

| | | | |
|---|---|---|---|
| 2012/0047551 A1 | 2/2012 | Pattar et al. | |
| 2014/0244001 A1 | 8/2014 | Glickfield et al. | |
| 2014/0303935 A1* | 10/2014 | Kamel | G05F 1/66 702/189 |
| 2014/0320311 A1 | 10/2014 | Huang et al. | |
| 2015/0019710 A1 | 1/2015 | Shaashua et al. | |
| 2015/0022337 A1 | 1/2015 | Gettings et al. | |
| 2015/0120317 A1* | 4/2015 | Mayou | A61B 5/14552 705/2 |
| 2015/0323974 A1* | 11/2015 | Shuster | H04M 1/72563 713/320 |
| 2016/0192112 A1* | 6/2016 | Sydir | H04W 4/006 340/686.6 |
| 2016/0212090 A1* | 7/2016 | Kshirsagar | H04L 51/16 |
| 2016/0245686 A1* | 8/2016 | Pal | G01M 13/045 |
| 2016/0255420 A1* | 9/2016 | McCleland | H04Q 9/00 340/870.07 |
| 2017/0006141 A1* | 1/2017 | Bhadra | H04W 4/005 |
| 2017/0010174 A1* | 1/2017 | Melen | B62D 15/025 |
| 2017/0124853 A1* | 5/2017 | Mehta | G08B 25/016 |
| 2017/0126834 A1* | 5/2017 | Fransen | H04L 67/303 |
| 2017/0142140 A1* | 5/2017 | Muddu | H04L 63/1425 |
| 2017/0160328 A1* | 6/2017 | Pal | G06N 99/005 |

OTHER PUBLICATIONS

International Search Report and Written Opinion for International Patent Application No. PCT/US2017/017181, dated May 15, 2017, 11 pages.

* cited by examiner

Primary Examiner — Julie Lieu
(74) Attorney, Agent, or Firm — Jordan IP Law, LLC (57) ABSTRACT

Systems and methods may detect a condition with respect to a first device and generate a distress signal if the condition satisfies one or more safety criteria that are relevant to a second device. Additionally, the distress signal may be broadcasted, wherein the distress signal bypasses one or more application controls of the first device and has a transmission range that is restricted to a local area. In one example, one or more local preventive actions may be triggered, via the application control(s), based on the distress signal.

20 Claims, 5 Drawing Sheets

EFFECTIVE HANDLING OF DISTRESS SIGNALS IN AN INTERNET OF THINGS ENVIRONMENT

TECHNICAL FIELD

Embodiments generally relate to distress signals. More particularly, embodiments relate to the effective handling of distress signals in an Internet of Things (IOT) environment.

BACKGROUND

The Internet of Things (IOT) may involve household devices such as thermostats, washers/dryers, and so forth, interactively reporting operational data to homeowners, utility companies, and other analytical services, wherein most modern IOT devices may be developed to support centralized control. Accordingly, when a particular IOT device has a message for one or more other IOT devices, the message may be passed through higher level control systems and that may delay or even drop the message if the system is busy or the other IOT device(s) are isolated (e.g., not connected to the centralized control). As a result, in some IOT systems, intercommunication between IOT peers is slow or impossible. Indeed, the intercommunication challenges may be heightened in systems involving complex heterogeneous IOT deployments. Moreover, in mission critical systems such as, for example, security installations, fire alarm systems, etc., such delays and/or disconnects may be unacceptable.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
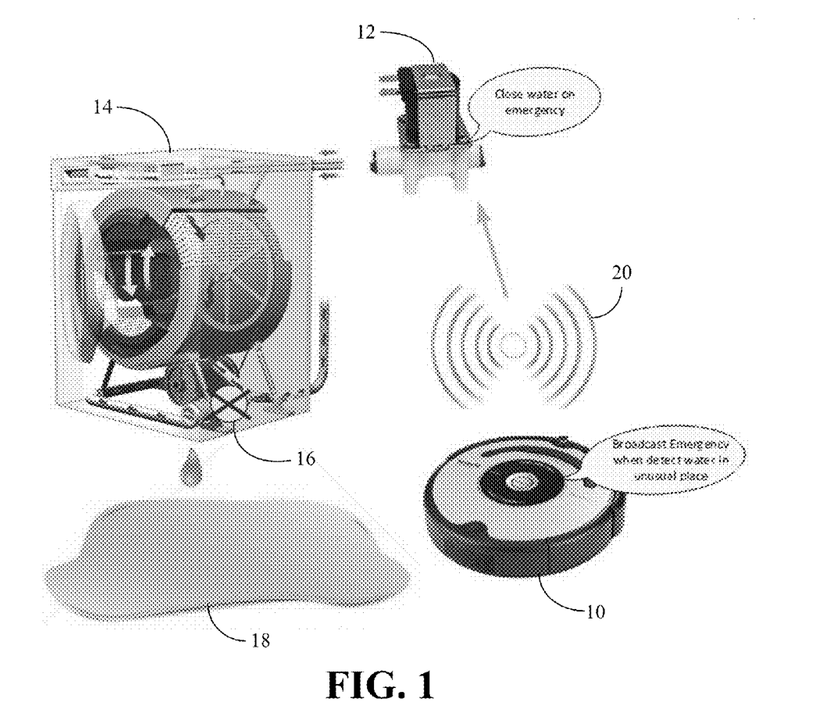
FIG. 1 is an illustration of an example of an IOT environment according to an embodiment.

Turning now to FIG. 1, an IOT environment is shown in which a first device 10 and a second device 12 operate within proximity to one another. In the illustrated example, the first device 10 is a robotic cleaner and the second device 12 is a smart water tap that supplies water to an appliance 14 (e.g., washing machine), although other types and configurations of devices may be used. The illustrated appliance 14 has a leaking valve 16 that causes water 18 to be deposited on the floor. Because the first device 10 is cleaning the floor, the first device 10 may detect the water 18 on the floor and automatically recognize that the water 18 is a condition (e.g., "Broadcast Emergency when detect water in unusual place") that gives rise to a safety concern such as, for example, flooding, property damage, slippery walking conditions, etc.

Moreover, the first device 10 may automatically determine that the condition is relevant to the second device 12, which functions as a source of water to the appliance 14, in the illustrated example. Accordingly, the first device 10 may broadcast a distress signal 20 that is received by the second device 12. The second device 12 may be configured to conduct one or more local preventive actions (e.g., "Close water on emergency") in response to the distress signal 20. The illustrated solution therefore enables the prevention of further possible damage.

As will be discussed in greater detail, the broadcast of the distress signal 20 may bypass one or more application controls of the first device 10, wherein the application controls may constitute a higher level communication path (e.g., uplink) to a centralized control system (e.g., server, analytical service, etc., not shown) also having a higher level communication path (e.g., downlink) to the second device 12. The illustrated peer-to-peer connection between the first device 10 and the second device 12 may therefore eliminate/reduce delays and/or dropped messages if the centralized control system is busy, the first or second devices 10, 12 are disconnected from the centralized control system, and so forth. Moreover, as will be discussed in greater detail, the first device 10 and the second device 12 may use the same or different protocols to communicate with the centralized control system. In the case of different protocols, the devices 10, 12 may communicate with one another through a translation gateway and/or translation/pairing components disposed within the devices 10, 12 themselves.

Additionally, the distress signal 20 may be configured with a transmission range that is restricted to the local area of the first device 10 and the second device 12. Limiting the transmission range may simplify the interoperability solution because the second device 12 may only need to be concerned with distress signals originating from nearby devices. In this regard, the distress signal 20 may be transmitted wirelessly via, for example, Bluetooth (e.g., Bluetooth Core Specification Version 4.0, Jun. 30, 2010, Bluetooth Special Interest Group/SIG), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), radio frequency (RF), infrared (IR), optical (e.g., light emitting diode/LED), or other transmission.

In one example, the distress signal 20 is encoded with an interoperability message that indicates parameters such as, for example, the alarm type, severity level, size of the affected area, event label, source identifier (ID), location, time, etc., or any combination thereof. For example, the interoperability message might be Morse coded into the flashing of an LED on the first device 10, wherein the second device 12 may be configured to optically detect the flashing and decode the interoperability message. Other encoding techniques may also be used.

The first device 10 may also trigger local preventive actions (e.g., shutdown, travel to a safe area) based on the distress signal 20 and/or the condition(s) giving rise to the distress signal 20. In this regard, the first device 10 may also discontinue the broadcast of the distress signal 20 after a predetermined number of transmissions (e.g., three) in order to prevent collisions with other distress signals and/or confusion/false positives on the part of the first device 10. For example, if a third device (not shown) and the first device 10 concurrently broadcast distress signals, discontinuing the broadcast signal 20 as described herein might enable both the first device 10 and the second device 12 to distinguish between the illustrated distress signal 20 and the distress signal (not shown) from the third device.

Figure 2:
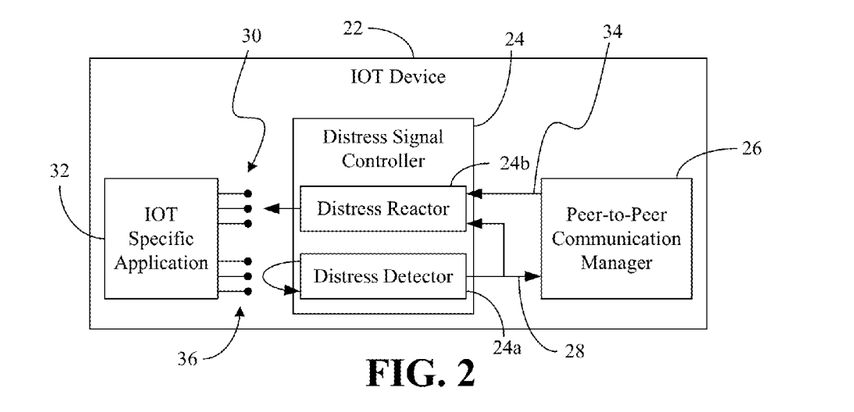
FIG. 2 is a block diagram of an example of an IOT device including a logic architecture according to an embodiment.

FIG. 2 shows an Internet of Things (IOT) device 22 that includes a logic architecture with a distress signal controller 24 (24a, 24b) and a peer-to-peer communication manager 26. In the illustrated example, the controller 24 includes a distress detector 24a to detect a condition with respect to the IOT device 22 and generate an outbound distress signal 28 if the condition satisfies one or more safety criteria (e.g., flooding, smoke, fire, earthquake, electrical short, etc.) that are relevant to a second device (not shown). In one example, the distress detector 24a polls one or more sensors 36 of the IOT device 22 in order to detect the condition.

Additionally, the peer-to-peer communication manager 26 may broadcast the outbound distress signal 28, wherein the outbound distress signal 28 bypasses one or more controls 30 of an IOT specific application 32. The application 32 may generally be part of a higher level uplink to a centralized control system (not shown). Moreover, the outbound distress signal 28 may have a transmission range that is restricted to a local area. For example, the peer-to-peer communication manager 26 may include one or more wireless physical transport components such as, for example, a Bluetooth radio, Wi-Fi radio, RF radio/antenna, IR transmitter, optical transmitter (e.g., LED), and so forth. In one example, the peer-to-peer communication manager 26 discontinues the broadcast of the outbound distress signal 28 after a predetermined number of transmissions.

The illustrated controller 24 also includes a distress reactor 24b to trigger, via the control(s) 30, one or more local preventive actions such as, for example, shutdown of the IOT device 22, reporting, etc., based on the outbound distress signal 28. Reporting (e.g., to a centralized control service) may be through a communication component (not shown) such as, for example, a Bluetooth radio or a Wi-Fi radio, wherein the component may be separate from or integrated with one or more physical transport components used by the peer-to-peer communication manager 26. The distress reactor 24b may also receive an inbound distress signal 34 originating from another nearby device (not shown), wherein the peer-to-peer communication manager 26 may capture the inbound distress signal 34 via, for example, Bluetooth radio, Wi-Fi radio, RF radio/antenna, IR transmitter, optical receiver, camera, etc. The outbound distress signal 28 and/or the inbound distress signal 34 may be encoded with an interoperability message that indicates, for example, an alarm type, a severity level, a size of an affected area, an event label, a source ID, a location, a time, and so forth.

Additionally, if the IOT device 22 uses a different communication protocol than one or more other nearby devices (not shown), the peer-to-peer communication manager 26 might include a translation and/or pairing component to ensure that the outbound distress signal 28 is understood by the other nearby device(s) and/or the inbound distress signal 34 is understood by the illustrated IOT device 22. For example, a pairing phase may provide the devices in question with an opportunity to establish common parameters to be used during the real-time exchange of distress signals. The translation/pairing component may also access a local database that enables conversion between interoperability messages having different formats, wherein the database may be stored to the device 22 during manufacture and/or updated after deployment. In another example, the device 22 may communicate with other nearby devices through a translation gateway operating within physical proximity of the devices in question. Other solutions may also be used to support different communication protocols.

Figure 3A:
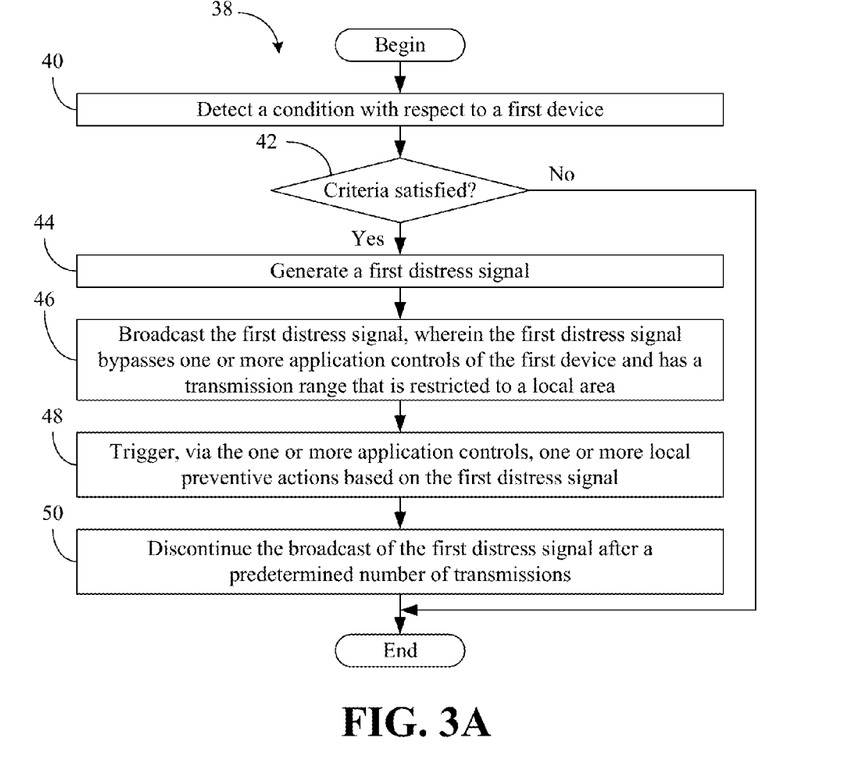
FIGS. 3A and 3B are flowcharts of examples of methods of operating a distress signal controller according to an embodiment.

FIG. 3A shows a method 38 of operating a logic architecture including a distress signal controller. The method 38 may generally be implemented in a device such as, for example, the devices 10, 12 (FIG. 1) and/or the IOT device 22 (FIG. 2), already discussed. More particularly, the method 38 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 40 provides for detecting a condition with respect to a first device. Block 40 may include, for example, polling one or more sensors (e.g., moisture sensors, temperature sensors, motion sensors, cameras, etc.) of the first device. A determination may be made at block 42 as to whether the condition satisfies one or more safety criteria (e.g., flooding, smoke, fire, earthquake, electrical short, etc.) that are relevant to a second device. If so, illustrated block 44 generates a first distress signal. As already noted, the first distress signal may be encoded with an interoperability message that indicates one or more of an alarm type, a severity level, a size of an affected area, an event label, a source ID, a location or a time.

Block 46 may broadcast the first distress signal, wherein the first distress signal bypasses one or more application controls of the first device and has a transmission range that is restricted to a local area. Illustrated block 48 triggers, via the one or more application controls, one or more local preventive actions based on the first distress signal. Additionally, the broadcast of the first distress signal may be discontinued after a predetermined number of transmissions at block 50. If a safety criteria is not satisfied at block 42, the illustrated method 38 terminates.

Figure 3B:
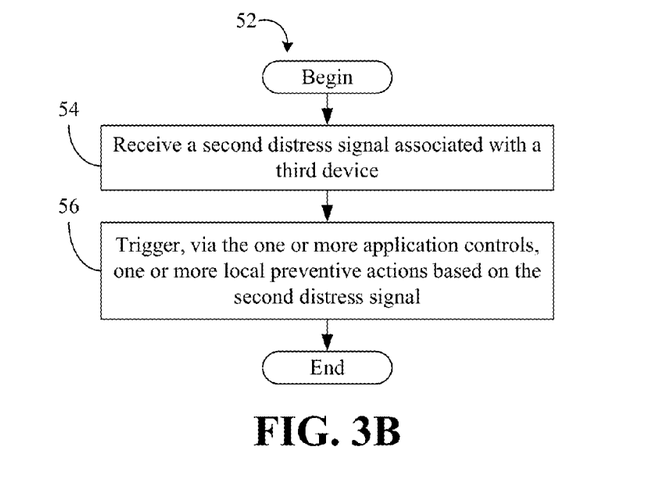

FIG. 3B shows another method 52 of operating a logic architecture including a distress signal controller. The method 52 may generally be implemented in a device such as, for example, the devices 10, 12 (FIG. 1) and/or the IOT device 22 (FIG. 2), already discussed. More particularly, the method 52 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 54 provides for receiving a second distress signal associated with a third device. Additionally, block 56 may trigger, via the one or more application controls, one or more local preventive actions based on the second distress signal.

Figure 4:
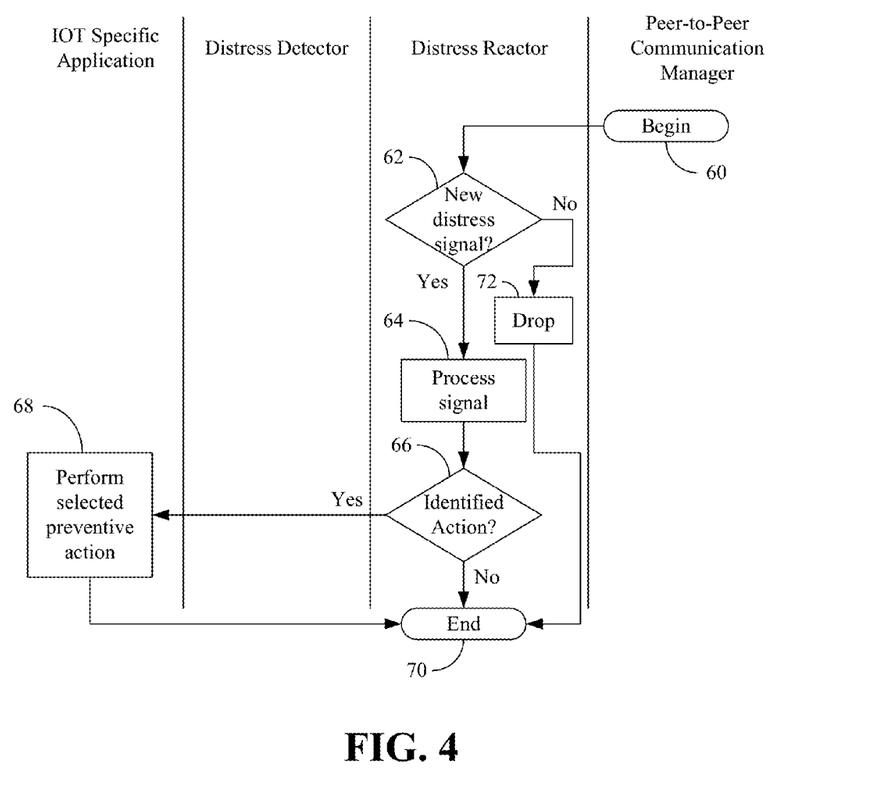
FIG. 4 is a flowchart of an example of a distress signal processing scenario according to an embodiment.

FIG. 4 shows a distress signal processing scenario in which a peer-to-peer communication manager such as, for example, the communication manager 26 (FIG. 2) receives a distress signal at a beginning block 60. A distress reactor such as, for example, the distress reactor 24b (FIG. 2), may determine at block 62 whether the distress signal is new. If so, the distress reactor may process the distress signal at block 64 and determine at block 66 whether a local preventive action is associated with the distress signal. Block 66 may take into consideration the various interoperability message attributes (e.g., alarm type, severity level, size of the affected area, event label, source ID, location, time) that may be embedded into the distress signal as well as any known actions (e.g., close on water emergency) linked to the attributes. If an action is identified, an IOT specific action such as, for example, the application 32 (FIG. 2), may perform the selected preventive action at block 68 and terminate the process at block 70.

If it is determined at block 62 that the distress signal is not new, the distress reactor may drop the signal at block 72 and terminate the process at block 70. Additionally, if it is determined at block 66 that there are no local preventive actions associated with the distress signal, the distress reactor may terminate the process at block 70.

Figure 5:
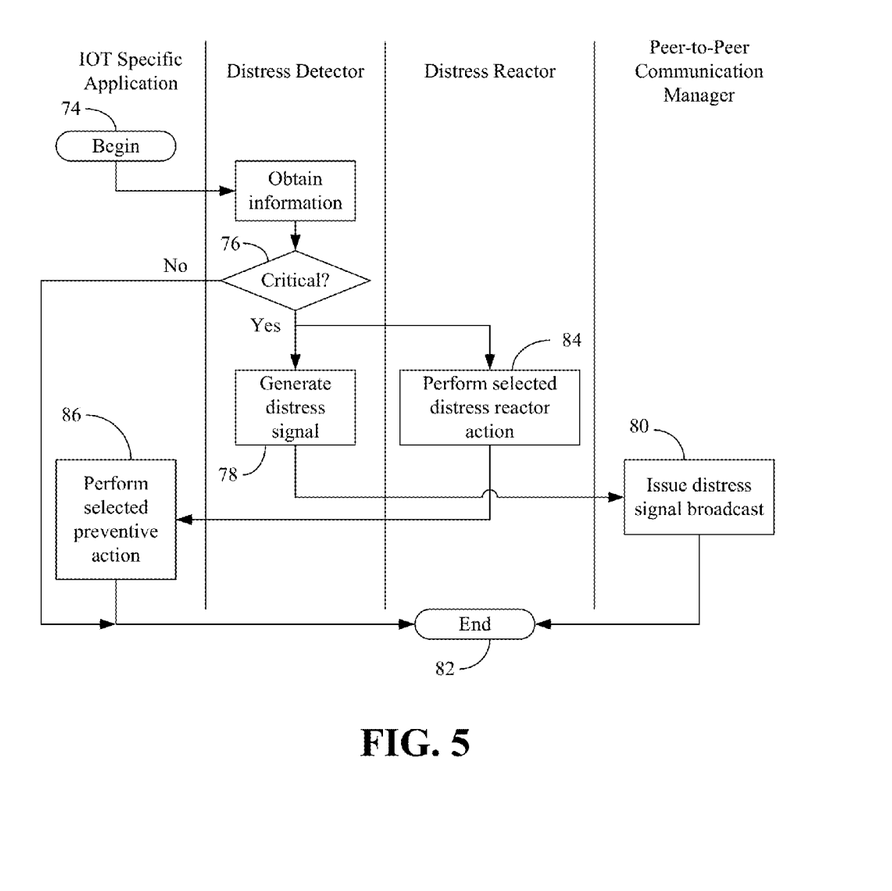
FIG. 5 is a flowchart of an example of a distress signal generation scenario according to an embodiment.

FIG. 5 shows a distress signal generation scenario in which an IOT specific action such as, for example, the application 32 (FIG. 2), identifies a condition with respect to an IOT device at a beginning block 74. A distress detector such as, for example, the distress detector 24a (FIG. 2) may obtain information relevant to the condition by, for example, polling one or more sensors on the IOT device in question. The distress detector may determine whether the condition is critical (e.g., the condition satisfies one or more safety criteria) at block 76. If so, the distress detector may generate a distress signal at block 78, wherein a peer-to-peer communication manager such as, for example, the communication manager 26 (FIG. 2) may issue a distress signal broadcast at a block 80 and terminate at block 82. Additionally, if it is determined at block 76 that the condition is critical, a distress reactor such as, for example, the distress reactor 24b (FIG. 2), may perform a selected distress reactor action (e.g., trigger a local preventive action) at block 84. The IOT specific application may perform the local preventive action at block 86 and terminate at block 82. If it is determined at block 76 that the condition is not critical, the distress detector may simply terminate at block 82.

Figure 6:
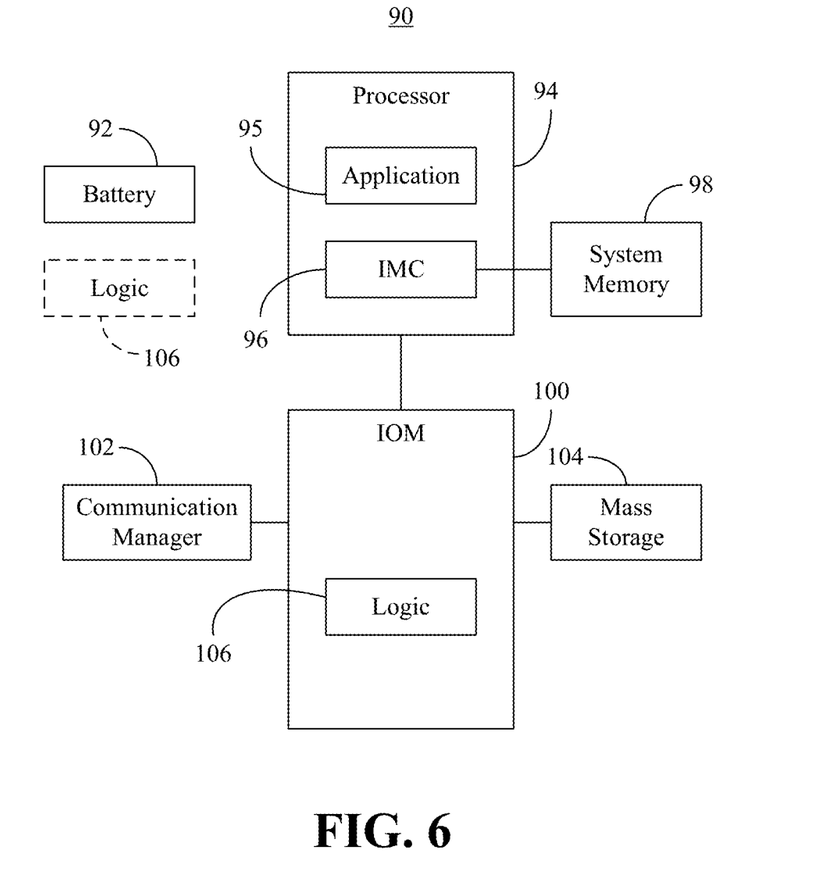
FIG. 6 is a block diagram of an example of an interoperable device according to an embodiment.

FIG. 6 shows an interoperable device 90 such as, for example, a robotic cleaner, smart water tap/valve, etc. The device 90 may be readily substituted for the devices 10, 12 (FIG. 1) and/or the IOT device 22 (FIG. 2), already discussed. In the illustrated example, the device 90 includes a battery 92 to supply power to the device 90 and a processor 94 having an application 95 (e.g., IOT specific application) and an integrated memory controller (IMC) 96, which may communicate with system memory 98. The system memory 98 may include, for example, dynamic random access memory (DRAM) configured as one or more memory modules such as, for example, dual inline memory modules (DIMMs), small outline DIMMs (SODIMMs), etc.

The illustrated device 90 also includes an input output (IO) module 100 implemented together with the processor 94 on a semiconductor die (not shown) as a system on chip (SoC), wherein the IO module 100 functions as a host device and may communicate with, for example, a peer-to-peer communication manager 102 and mass storage 104 (e.g., flash memory, block storage, solid state disk/SSD, etc.). The IO module 100 may include logic 106 (e.g., implemented in logic instructions, configurable logic, fixed-functionality logic hardware, etc., or any combination thereof) that detects a condition with respect to the device 90 and generates an outbound distress signal if the condition satisfies one or more safety criteria that are relevant to a second device. Additionally, the logic 106 may broadcast the outbound distress signal via the peer-to-peer communication manager 102, wherein the outbound distress signal bypasses one or more application controls of the device 90 and has a transmission range that is restricted to a local area.

Moreover, the logic 106 may trigger, via the one or more application controls, one or more local preventive actions based on the outbound distress signal. In one example, the logic 106 receives, via the peer-to-peer communication manager 102, an inbound distress signal and triggers, via the one or more application controls, one or more local preventive actions based on the inbound distress signal. Thus, the logic 106 may implement one or more aspects of the method 38 (FIG. 3A) and/or the method 52 (FIG. 3B), already discussed.

ADDITIONAL NOTES AND EXAMPLES

Example 1 may include an interoperable first device comprising a peer-to-peer communication manager, one or more application controls, and logic, implemented at least partly in one or more of configurable logic or fixed-functionality logic hardware, to detect a condition with respect to the first device, generate a first distress signal if the condition satisfies one or more safety criteria that are relevant to a second device, and broadcast, via the peer-to-peer communication manager, the first distress signal, wherein the first distress signal bypasses one or more application controls of the first device and has a transmission range that is restricted to a local area.

Example 2 may include the first device of Example 1, wherein the logic is to trigger, via the one or more application controls, one or more local preventive actions based on the first distress signal.

Example 3 may include the first device of Example 1, wherein the logic is to receive a second distress signal associated with a third device, and trigger one or more local preventive actions based on the second distress signal.

Example 4 may include the first device of Example 1, further including one or more sensors, wherein the logic is to poll at least one of the one or more sensors to detect the condition.

Example 5 may include the first device of Example 1, wherein the first distress signal is to be encoded with an interoperability message that indicates one or more of an alarm type, a severity level, a size of an affected area, an event label, a source identifier, a location or a time.

Example 6 may include the first device of any one of Examples 1 to 5, wherein the logic is to discontinue the broadcast of the first distress signal after a predetermined number of transmissions.

Example 7 may include a distress signal controller apparatus comprising logic, implemented at least partly in one or more of configurable logic or fixed-functionality logic hardware, to detect a condition with respect to a first device, generate a first distress signal if the condition satisfies one or more safety criteria that are relevant to a second device, and broadcast the first distress signal, wherein the first distress signal bypasses one or more application controls of the first device and has a transmission range that is restricted to a local area.

Example 8 may include the apparatus of Example 7, wherein the logic is to trigger one or more local preventive actions based on the first distress signal.

Example 9 may include the apparatus of Example 7, wherein the logic is to receive a second distress signal associated with a third device, and trigger one or more local preventive actions based on the second distress signal.

Example 10 may include the apparatus of Example 7, wherein the logic is to poll one or more sensors of the first device to detect the condition.

Example 11 may include the apparatus of Example 7, wherein the first distress signal is to be encoded with an interoperability message that indicates one or more of an alarm type, a severity level, a size of an affected area, an event label, a source identifier, a location or a time.

Example 12 may include the apparatus of any one of Examples 7 to 11, wherein the logic is to discontinue the broadcast of the first distress signal after a predetermined number of transmissions.

Example 13 may include a method of operating a distress signal controller, comprising detecting a condition with respect to a first device, generating a first distress signal if the condition satisfies one or more safety criteria that are relevant to a second device, and broadcasting the first distress signal, wherein the first distress signal bypasses one or more application controls of the first device and has a transmission range that is restricted to a local area.

Example 14 may include the method of Example 13, further including triggering, via the one or more application controls, one or more local preventive actions based on the first distress signal.

Example 15 may include the method of Example 13, further including receiving a second distress signal associated with a third device, and triggering, via the one or more application controls, one or more local preventive actions based on the second distress signal.

Example 16 may include the method of Example 13, wherein detecting the condition includes polling one or more sensors of the first device.

Example 7 may include the method of Example 13, wherein the first distress signal is encoded with an interoperability message that indicates one or more of an alarm type, a severity level, a size of an affected area, an event label, a source identifier, a location or a time.

Example 18 may include the method of any one of Examples 13 to 17, further including discontinuing the broadcasting of the first distress signal after a predetermined number of transmissions.

Example 19 may include at least one non-transitory computer readable storage medium comprising a set of instructions, which when executed by a first device, cause the first device to detect a condition with respect to the first device, generate a first distress signal if the condition satisfies one or more safety criteria that are relevant to a second device, and broadcast the first distress signal, wherein the first distress signal bypasses one or more application controls of the first device and has a transmission range that is restricted to a local area.

Example 20 may include the at least one non-transitory computer readable storage medium of Example 19, wherein the instructions, when executed, further cause the first device to trigger, via the one or more application controls, one or more local preventive actions based on the first distress signal.

Example 21 may include the at least one non-transitory computer readable storage medium of Example 19, wherein the instructions, when executed, cause the first device to receive a second distress signal associated with a third device, and trigger, via the one or more application controls, one or more local preventive actions based on the second distress signal.

Example 22 may include the at least one non-transitory computer readable storage medium of Example 19, wherein the instructions, when executed, cause the first device to poll one or more sensors of the first device to detect the condition.

Example 23 may include the at least one non-transitory computer readable storage medium of Example 19, wherein the first distress signal is to be encoded with an interoperability message that indicates one or more of an alarm type, a severity level, a size of an affected area, an event label, a source identifier, a location or a time.

Example 24 may include the at least one non-transitory computer readable storage medium of any one of Examples 19 to 23, wherein the instructions, when executed, cause the first device to discontinue the broadcast of the first distress signal after a predetermined number of transmissions.

Example 25 may include a distress signal controller apparatus comprising means for detecting a condition with respect to a first device, means for generating a first distress signal if the condition satisfies one or more safety criteria that are relevant to a second device, and means for broadcasting the first distress signal, wherein the first distress signal bypasses one or more application controls of the first device and has a transmission range that is restricted to a local area.

Example 26 may include the apparatus of Example 25, further including means for triggering, via the one or more application controls, one or more local preventive actions based on the first distress signal.

Example 27 may include the apparatus of Example 25, further including means for receiving a second distress signal associated with a third device, and means for triggering, via the one or more application controls, one or more local preventive actions based on the second distress signal.

Example 28 may include the apparatus of Example 25, wherein detecting the condition is to include polling one or more sensors of the first device.

Example 29 may include the apparatus of Example 25, wherein the first distress signal is to be encoded with an interoperability message that indicates one or more of an alarm type, a severity level, a size of an affected area, an event label, a source identifier, a location or a time.

Example 30 may include the apparatus of any one of Examples 25 to 29, further including means for discontinuing the broadcasting of the first distress signal after a predetermined number of transmissions.

Techniques described herein may therefore improve real time effectiveness in the handling of critical events in IOT systems and provide a lower cost solution. Moreover, scalable IOT solutions may be established with no bottlenecks or mandatory human involvement. Additionally, techniques may support larger and more complex heterogeneous IOT environments, while providing effortless integration between peers and ease of integration into to existing IOT devices and ecosystems.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A first device comprising:
a peer-to-peer communication manager;
one or more application controls; and
logic, implemented at least partly in one or more of configurable logic or fixed-functionality logic hardware, to:
detect a condition with respect to the first device,
generate a first distress signal if the condition satisfies one or more safety criteria that are relevant to a second device,
broadcast, via the peer-to-peer communication manager, the first distress signal, wherein the first distress signal bypasses the one or more application controls of the first device and has a transmission range that is restricted to a local area, and
trigger, via the one or more application controls, one or more local preventive actions by the first device based on one or more of the first distress signal or the condition.

2. The first device of claim 1, wherein the logic is to:
receive a second distress signal associated with a third device, and
trigger one or more local preventive actions based on the second distress signal.

3. The first device of claim 1, further including one or more sensors, wherein the logic is to poll at least one of the one or more sensors to detect the condition.

4. The first device of claim 1, wherein the first distress signal is to be encoded with an interoperability message that indicates one or more of an alarm type, a severity level, a size of an affected area, an event label, a source identifier, a location or a time.

5. The first device of claim 1, wherein the logic is to discontinue the broadcast of the first distress signal after a predetermined number of transmissions.

6. An apparatus comprising:
logic, implemented at least partly in one or more of configurable logic or fixed-functionality logic hardware, to:
detect a condition with respect to a first device,
generate a first distress signal if the condition satisfies one or more safety criteria that are relevant to a second device,
broadcast the first distress signal, wherein the first distress signal bypasses one or more application controls of the first device and has a transmission range that is restricted to a local area, and
trigger, via the one or more application controls, one or more local preventive actions by the first device based on one or more of the first distress signal or the condition.

7. The apparatus of claim 6, wherein the logic is to:
receive a second distress signal associated with a third device, and
trigger one or more local preventive actions based on the second distress signal.

8. The apparatus of claim 6, wherein the logic is to poll one or more sensors of the first device to detect the condition.

9. The apparatus of claim 6, wherein the first distress signal is to be encoded with an interoperability message that indicates one or more of an alarm type, a severity level, a size of an affected area, an event label, a source identifier, a location or a time.

10. The apparatus of claim 6, wherein the logic is to discontinue the broadcast of the first distress signal after a predetermined number of transmissions.

11. A method comprising:
detecting a condition with respect to a first device;
generating a first distress signal if the condition satisfies one or more safety criteria that are relevant to a second device;
broadcasting the first distress signal, wherein the first distress signal bypasses one or more application controls of the first device and has a transmission range that is restricted to a local area, and
triggering, via the one or more application controls, one or more local preventive actions by the first device based on one or more of the first distress signal or the condition.

12. The method of claim 11, further including:
receiving a second distress signal associated with a third device; and
triggering, via the one or more application controls, one or more local preventive actions based on the second distress signal.

13. The method of claim 11, wherein detecting the condition includes polling one or more sensors of the first device.

14. The method of claim 11, wherein the first distress signal is encoded with an interoperability message that indicates one or more of an alarm type, a severity level, a size of an affected area, an event label, a source identifier, a location or a time.

15. The method of claim 11, further including discontinuing the broadcasting of the first distress signal after a predetermined number of transmissions.

16. At least one non-transitory computer readable storage medium comprising a set of instructions, which when executed by a first device, cause the first device to:
   detect a condition with respect to the first device;
   generate a first distress signal if the condition satisfies one or more safety criteria that are relevant to a second device;
   broadcast the first distress signal, wherein the first distress signal bypasses one or more application controls of the first device and has a transmission range that is restricted to a local area; and
   trigger, via the one or more application controls, one or more local preventive actions by the first device based on one or more of the first distress signal or the condition.

17. The at least one non-transitory computer readable storage medium of claim 16, wherein the instructions, when executed, cause the first device to:
   receive a second distress signal associated with a third device; and
   trigger, via the one or more application controls, one or more local preventive actions based on the second distress signal.

18. The at least one non-transitory computer readable storage medium of claim 16, wherein the instructions, when executed, cause the first device to poll one or more sensors of the first device to detect the condition.

19. The at least one non-transitory computer readable storage medium of claim 16, wherein the first distress signal is to be encoded with an interoperability message that indicates one or more of an alarm type, a severity level, a size of an affected area, an event label, a source identifier, a location or a time.

20. The at least one non-transitory computer readable storage medium of claim 16, wherein the instructions, when executed, cause the first device to discontinue the broadcast of the first distress signal after a predetermined number of transmissions.

* * * * *